(12) United States Patent
Ho

(10) Patent No.: US 6,721,152 B2
(45) Date of Patent: Apr. 13, 2004

(54) BOOST CIRCUIT AND POWER SUPPLY CONVERTER

(75) Inventor: Yung-Hung Ho, Keelung (TW)

(73) Assignee: Amtran Technology Co., Ltd. (TW)

( * ) Notice: Subject to any disclaimer, the term of this patent is extended or adjusted under 35 U.S.C. 154(b) by 0 days.

(21) Appl. No.: 10/160,359

(22) Filed: May 30, 2002

(65) Prior Publication Data

US 2003/0223252 A1 Dec. 4, 2003

(51) Int. Cl.[7] ................................................. H02H 9/08
(52) U.S. Cl. ........................ 361/93.9; 315/306; 363/59
(58) Field of Search ............................. 363/50, 55, 39, 363/49; 361/57, 58, 93.1, 93.7, 93.9, 111, 118; 315/306, 307; 323/908

(56) References Cited

U.S. PATENT DOCUMENTS 5,343,122 A * 8/1994 Sugimori et al. ....... 315/307 X
5,825,139 A * 10/1998 Nuckolls et al. ............ 315/307
6,504,692 B1 * 1/2003 Macbeth et al. .............. 361/42

* cited by examiner

Primary Examiner—Jessica Han
(74) Attorney, Agent, or Firm—Martine & Penilla, LLP

(57) ABSTRACT

The invention provides a boost circuit including a first capacitor, a transformer, a sensing resistor and a second capacitor. The transformer has a boost side coil with its one end connected in series with the first capacitor. The sensing resistor is connected in series with the other end of the boost side coil of the transformer, and one end of the second capacitor is connected in parallel with the transformer. Also, the invention provides a power supply converter including a boost circuit and a detection circuit. The boost circuit is used to produce a voltage and output a detection signal to detect the occurrence of a spark. The detection circuit is electrically connected with the boost circuit and is used to receive the detection signal output by the boost circuit. When the detection circuit detects the detection signal contains an inrush signal, it determines that a spark is occurring within the boost circuit and outputs a control signal according to the inrush signal.

4 Claims, 3 Drawing Sheets

BOOST CIRCUIT AND POWER SUPPLY CONVERTER

BACKGROUND OF THE INVENTION

1. Field of the Invention

The invention relates to a boost circuit and a power supply converter and, more particularly, to a boost circuit and a power supply converter capable of detecting the occurrence of a spark.

2. Description of the Related Art

Coupled with the development of the optoelectronic industry, luminescent sources are not only utilized in daily life lighting, but smaller luminescent sources (LCD lamps for instance) are also being extensively applied in various electronic products. Take the LCD display for example, it is provided with a luminescent source used as the backlight.

Generally, a power supply converter is needed to light a lamp. A conventional power supply converter is chiefly consisted of an oscillator and a boost circuit. The oscillator produces an alternating current frequency required by the lamp, and the boost circuit produces a voltage high enough to activate the lamp.

Referring to FIG. 1, a conventional boost circuit 1 is chiefly consisted of a sensing resistor $R_S$ used to sense loop currents, a converter T used to convert voltages and a capacitor C used to store voltages. In FIG. 1, the symbol 2 represents a connector, and the symbol 3 represents a lamp. In other words, the lamp 3 is connected with the boost circuit 1 via the connector 2.

With respect to the above structure, if the connection between the lamp 3 and the connector 2 is not sound, a spark occurs within the boost circuit 1 due to the loose contact. Moreover, if short-distance breakage exists within the boost circuit 1, or the winding in the converter T of the boost circuit is disconnected, a spark is also brought about. Also, if a particular conductor in the product is situated too close to the boost circuit 1, a spark occurs as well.

For the reason that when a spark occurs within products of the early days, common lamps are still able to luminesce normally. The phenomenon is not easily detected based upon the product appearances or quality of image, and therefore, without inspecting the products before they become commercially available, they may result in some undesirable situations such as shortening the life of products. In worse cases, serious disasters may be caused if the spark come into contact with combustible gases (circumstances such as products are located at gas stations).

To determine whether a spark occurs within the product, a sensing resistor is commonly used for detection, that is, the output voltage waveform at the point A shown in FIG. 1 is detected to decide if the boost circuit is normal. However, whether a spark occurs within the boost circuit cannot be accurately detected merely using such a method. Referring to FIG. 2A, when a spark occurs within the boost circuit, theoretically inrush signals a1 and a2 are supposed to be detected at the point A. Nevertheless, it is observed from FIG. 2A that by using the conventional detecting method, the inrush signals a1 and a2 are possibly hidden within the output waveform and are not apparently perceived. Therefore, defective products may become commercially available, thereby causing hazards when using them.

In view of the above issues, to authentically detect products that have sparks and so as to prevent them from becoming commercially available, or to activate protection mechanisms when sparks occur within the products, is a vital task. To sum up, how to provide a boost circuit or power supply converter that is able to accurately detect the occurrence of sparks is an essential topic.

SUMMARY OF THE INVENTION

One object of the invention is to provide a boost circuit that is able to accurately detect the occurrence of a spark.

Another object of the invention is to provide a power supply converter that is able to accurately detect the occurrence of a spark.

The feature of the invention is to employ the high pass property of capacitance, to detect inrush signals produced by a boost circuit or power supply converter, thereby accurately determining the occurrence of a spark.

To accomplish the above objects, the present invention provides a boost circuit including a first capacitor, a transformer, a sensing resistor and a second capacitor. The transformer has a boost side coil with its one end connected in series with the first capacitor and the other end connected in series with the sensing resistor. One end of the second capacitor is connected in parallel with the transformer.

Also, the invention provides a power supply converter including a boost circuit and a detection circuit. The boost circuit is used to produce a voltage and output a detection signal for spark detection. The detection circuit is electrically connected with the boost circuit to receive the detection signal output by the boost circuit. When the detection circuit detects that the detection signal contains an inrush signal, it determines that spark is occurring within the boost circuit and outputs a control signal according to the inrush signal.

BRIEF DESCRIPTION OF THE DRAWINGS

The objects, advantages and characteristics in accordance with the embodiment of the invention are described in detail by referring to the drawings, wherein.

DESCRIPTION OF THE PREFERRED EMBODIMENT

The preferred embodiment of the invention is illustrated in accordance with the accompanying drawings. It is to be noted that the same reference symbols are used to denote the same elements for convenience sake.

Figure 1:
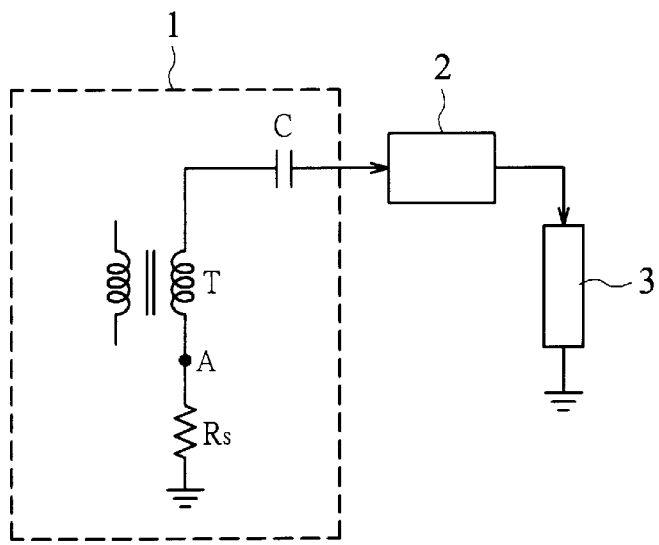
FIG. 1 is a circuit diagram showing a connection relationship between a conventional boost circuit and a lamp.
Figure 3:
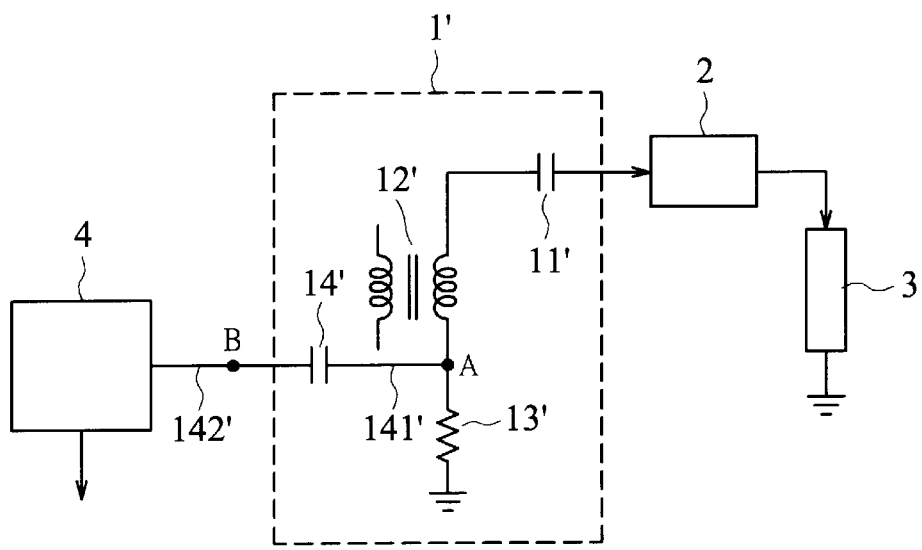
FIG. 3 is a circuit diagram showing a connection relationship between a boost circuit and a lamp in accordance with the invention.

Referring to FIG. 3, the boost circuit 1' in accordance with the embodiment of the invention includes a first capacitor 11', a transformer 12', a sensing resistor 13' and a second capacitor 14'.

One end 141' of the second capacitor 14' is electrically connected between the transformer 12' and the sensing resistor 13'. In this case, a detector 4 is used to detect the output signal of the other end 142' of the second capacitor 14'. When the output signal containing an inrush signal $b_1$ (or an inrush signal $b_2$) is detected, a spark is determined to be occurring within the boost circuit. In the embodiment, the detector 4 can be an oscilloscope or other detection circuits.

Figure 2A:
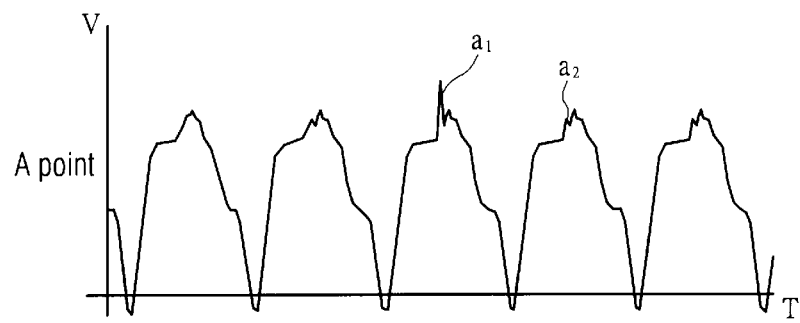
FIG. 2A is a waveform diagram showing a voltage output of the boost circuit at point A.
Figure 2B:
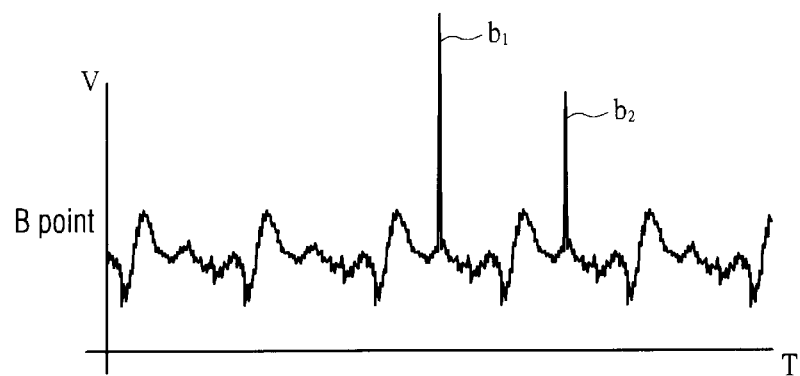
FIG. 2B is a waveform diagram showing a voltage output of the boost circuit at point B.

It is observed from FIGS. 2A and 2B that, because boost circuit 1' of the invention, by the high pass property of the second capacitor 14', enables the detector 4' to detect the inrush signal $b_1$ (or the inrush signal $b_2$) of the waveform at the point A, and as a result, the spark occurring within the boost circuit 1' can be accurately detected.

Figure 4:
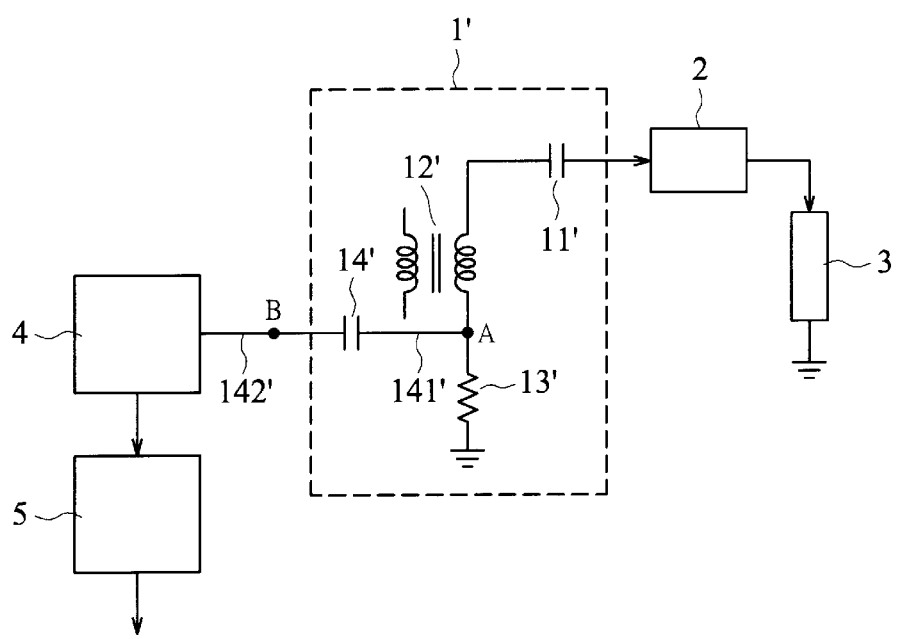
FIG. 4 is a circuit diagram showing a connection relationship between a power supply converter and a lamp in accordance with the invention.

The above description is related to the boost circuit of the invention, and FIG. 4 is used below to illustrate a power supply converter of the invention.

Referring to FIG. 4, the power supply converter of the invention includes a boost circuit 1' and a detection circuit 4. The circuit of boost circuit 1' is described in the aforesaid embodiment and is not described further. The boost circuit 1' is used to produce a comparatively higher voltage and to output a detection signal used to detect a spark. The detection circuit 4 is electrically connected with the boost circuit 1' and is used to receive the detection signal output by the boost circuit. When the detection circuit detects that the detection signal contains an inrush signal, it determines that a spark is occurring within the boost circuit and outputs a control signal according to the inrush signal.

Referring to FIG. 4, the power supply converter of the invention can additionally include a protection circuit 5. The protection circuit 5 is electrically connected with the detection circuit 4 and is used to receive the control signal output by the detection circuit, thereby producing a shutdown signal according to the control signal. As a result, when a spark occurs within an electronic product, the product can proceed with the shutdown process based upon the shutdown signal produced by the protection circuit 5 to avoid hazards.

The specific example in the preferred embodiment above is only illustrative with respect to the technical content of the invention, but not to limit the invention within the embodiment. Various modifications and implementations can be made without departing from the spirit of the invention and the appended claims.

What is claimed is:

1. A power supply converter for converting a first voltage to a second voltage, comprising:
   a boost circuit for producing the second voltage and outputting a detection signal to detect spark; and
   a detection circuit, electrically connected with the boost circuit, for receiving the detection signal output from the boost circuit; when the detection circuit detects the detection signal contains an inrush signal, it determines that spark is occurring within the boost circuit and outputs a control signal according to the inrush signal.

2. The power supplier converter as described in claim 1, further comprising a protection circuit, electrically connected with the detection circuit, for receiving the control signal output by the detection circuit, and producing a shutdown signal according to the control signal.

3. The power supplier converter as described in claim 1, wherein the boost circuit comprises:
   a first capacitor;
   a transformer having a boost side coil with its one end connected in series with the first capacitor;
   a sensing resistor connected in series with the other end of the boost side coil of the transformer; and
   a second capacitor with one end electrically connected between the transformer and the sensing resistor.

4. The power supplier converter as described in claim 3, wherein the detection signal is output from the other end of the second capacitor of the boost circuit.

* * * * *